US011079477B2

(12) United States Patent
Sparbert et al.

(10) Patent No.: US 11,079,477 B2
(45) Date of Patent: Aug. 3, 2021

(54) OPTICAL SCANNING SYSTEM

(71) Applicant: Robert Bosch GmbH, Stuttgart (DE)

(72) Inventors: Jan Sparbert, Rutesheim (DE);
Siegwart Bogatscher, Leonberg (DE);
Juergen Hasselbach, Stuttgart (DE);
Remigius Has, Grafenau-Daetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/498,124

(22) PCT Filed: Mar. 28, 2018

(86) PCT No.: PCT/EP2018/057930
§ 371 (c)(1),
(2) Date: Sep. 26, 2019

(87) PCT Pub. No.: WO2018/178157
PCT Pub. Date: Oct. 4, 2018

(65) Prior Publication Data
US 2020/0025891 A1 Jan. 23, 2020

(30) Foreign Application Priority Data
Mar. 31, 2017 (DE) .................... 102017205504.9

(51) Int. Cl.
*G01S 7/481* (2006.01)
*G02B 26/08* (2006.01)
*G02B 26/10* (2006.01)
(52) U.S. Cl.
CPC .......... *G01S 7/4817* (2013.01); *G01S 7/4812* (2013.01); *G02B 26/0875* (2013.01); *G02B 26/10* (2013.01)

(58) Field of Classification Search
USPC .......... 359/197.1, 201.2, 209.1–211.5, 220.1
See application file for complete search history.

(56) References Cited

U.S. PATENT DOCUMENTS 4,168,126 A * 9/1979 Altman .................. G01B 11/02
356/640
5,384,453 A * 1/1995 Peng .................. G06K 7/10831
235/457

(Continued)

FOREIGN PATENT DOCUMENTS

AT 507684 A4 7/2010
DE 19800553 A1 8/1998
(Continued)

OTHER PUBLICATIONS

International Search Report for PCT/EP2018/057930, dated Jun. 28, 2018.

*Primary Examiner* — Jennifer D. Carruth
(74) *Attorney, Agent, or Firm* — Norton Rose Fulbright US LLP; Gerard Messina

(57) ABSTRACT

An optical scanning system is described, including a rotor that is set up to rotate about an axis of rotation during a scanning process, an optical lens that is situated on the rotor in such a way that the lens is situated on the axis of rotation, an optical transmit unit that is situated on the rotor and is set up to send out a scanning beam in the direction of an optical axis of the lens, and an optical receive unit that is situated on the rotor and includes a detector that is set up to receive a reflected scanning beam, the detector being situated such that the reflected scanning beam is focused onto the detector by the lens.

10 Claims, 4 Drawing Sheets

(56) References Cited

U.S. PATENT DOCUMENTS

| | | | |
|---|---|---|---|
| 6,765,544 B1 * | 7/2004 | Wynne Willson | H04N 9/3141 |
| | | | 345/6 |
| 6,879,419 B2 * | 4/2005 | Richman | G02B 13/06 |
| | | | 359/203.1 |
| 8,836,922 B1 | 9/2014 | Pennecot et al. | |
| 2004/0222366 A1 * | 11/2004 | Frick | G01S 7/4817 |
| | | | 250/236 |
| 2006/0039068 A1 * | 2/2006 | Tokita | G02B 27/286 |
| | | | 359/487.05 |
| 2012/0138728 A1 | 6/2012 | Brunton et al. | |
| 2013/0021474 A1 | 1/2013 | Taylor et al. | |
| 2015/0022874 A1 | 1/2015 | Martin et al. | |

FOREIGN PATENT DOCUMENTS

| | | |
|---|---|---|
| DE | 10002137 A1 | 8/2000 |
| DE | 19928958 A1 | 11/2000 |
| DE | 10137263 A1 | 2/2003 |
| DE | 102012102244 A1 | 10/2012 |
| DE | 202013103233 U1 | 10/2014 |
| DE | 102013215627 A1 | 2/2015 |
| EP | 1562055 A2 | 8/2005 |
| JP | H0346582 A | 2/1991 |
| JP | H04161813 A | 6/1992 |
| JP | H06319018 A | 11/1994 |
| JP | 2005003804 A | 1/2005 |
| JP | 2008082782 A | 4/2008 |
| JP | 2010501069 A | 1/2010 |
| JP | 2013195302 A | 9/2013 |
| JP | 2015021968 A | 2/2015 |
| JP | 2015148605 A | 8/2015 |

* cited by examiner

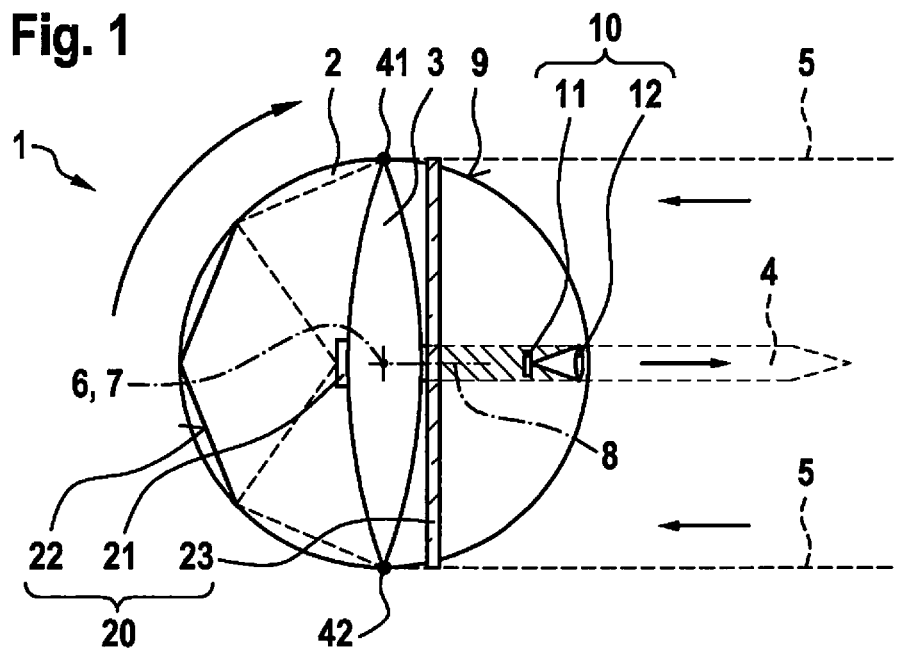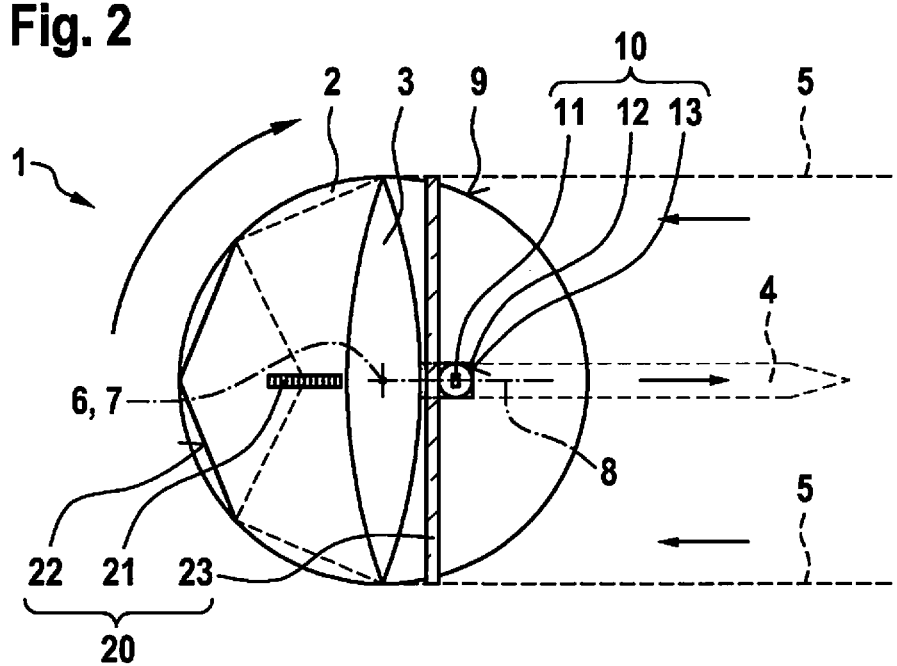

OPTICAL SCANNING SYSTEM

FIELD

The present invention relates to an optical scanning system.

BACKGROUND INFORMATION

Current scanning systems, in particular biaxial rotating 3-D laser scanners, so-called macroscanners, in which the optical axes of the transmit and receive units run parallel to one another at a certain distance from one another, have a certain constructive size. This holds both for macroscanners in which a mirror or mirror system rotates and for macroscanners in which the transmit and receive units are situated parallel to one another on the rotor.

However, for integration in particular environments, for example in vehicle headlights, a particularly flat constructive shape having a low constructive height and having a small rotor diameter is advantageous. An approach for reducing the constructive size of a macroscanner is to guide the transmission beam path and reception beam path partly through the same lens. Because as a result the optical axes of the transmit unit and receive unit outside the sensor are identical, such scanners can also be called coaxial.

U.S. Pat. No. 8,836,922 B1 describes a coaxial macroscanner in which a receiver lens is simultaneously also used as a collimation lens for a transmission path. A disadvantage of the approach describer therein is that the transmission beam cannot be expanded up to a maximum lens diameter and simultaneously collimated, which would be advantageous for increased transmit power and thus an increased range, while simultaneously ensuring eye safety. In addition, here the diameter of the receive apparatus is smaller than the diameter of the rotor.

German Patent No. DE 102012102244 B4 and German Patent Application NO. DE 102013215627 A1 describe further optical scanning systems.

SUMMARY

An example optical scanning system according to the present invention includes a rotor that is set up to rotate about an axis of rotation during a scanning process, an optical lens that is situated on the rotor in such a way that the lens lies on the axis of rotation, an optical transmit unit that is situated on the rotor and is set up to send out a scanning beam in the direction of an optical axis, and an optical receive unit that is situated on the rotor and that includes a detector that is set up to receive a reflected scanning beam, the detector being situated such that the reflected scanning beam is focused onto the detector by the lens.

Both the optical transmit unit and the optical receive unit are situated on the rotor. This means that there is a mechanical connection between the optical transmit unit and the rotor and between the optical receive unit and the rotor, so that during a rotation of the rotor the optical transmit unit and the optical receive unit are also moved about the axis of rotation. Because the optical lens is also situated on the rotor, this lens also rotates about the axis of rotation with the rotor. The rotor is preferably a circular disk. The optical lens, the optical transmit unit, and the optical receive unit are preferably situated on the same side of the rotor.

The aperture of the lens significantly influences the sensitivity of the optical scanning system. Therefore, it is advantageous if the lens is made as large as possible. In the configuration of the optical lens according to the present invention, the lens rotates with the rotor. Therefore, the lens, which is a particularly large component of the optical scanning system, requires a minimum space for its rotation. In this way, a particularly compact design of the optical scanning system is enabled. The optical scanning system can in this way be made particularly compact, in particular in its height and in its diameter. In addition, the optical scanning system according to the present invention enables a maximum receive aperture that is directly functionally dependent on the diameter of the rotor. In this way, an optical scanning system can be provided having a particularly large range, with small dimensions of the optical scanning system. Because the rotor, with the units situated thereon, rotates about the axis of rotation, a measurement is enabled over 360° in a scanning plane, for example horizontally.

An optical scanning system is thus provided whose receive aperture matches the rotor diameter, and whose transmit beam is expanded in order to increase the transmit power, while at the same time ensuring eye safety. In addition, the optical scanning system according to the present invention has the advantage that it is easily adjustable. Thus, particularly large optical elements may be used, so that tolerances can be controlled more easily, or at least have a relatively small influence on the quality of the optical scanning system. Because the scanning system is a coaxial scanning system, tolerances are less relevant with regard to the rotor. The optical system can in addition be made at low cost, because only a minimum number of optical elements are used. In particular, if the lens has a through-opening in its center or a mounting base on its surface, this can be used for a low-tolerance pressing into place or adjustment, including gluing to transmit and receive elements.

Preferred further developments of the present invention are described herein.

Preferably, the optical lens is situated in such way that a center of gravity of the lens is situated on the axis of rotation. The lens is thus situated in such a way that it rotates about its center of gravity when there is a rotation of the rotor. Here, the center of gravity is a mass center of gravity of the lens or a geometrical center of gravity of the lens. Particularly preferably, the center of gravity is both a mass center of gravity and a geometrical center of gravity of the lens.

Preferably, an envelope surface is defined by an outer circumference of the lens during its rotation about the axis of rotation, and the optical transmit unit and the optical receive unit are situated on the rotor in such a way that a region of the optical transmit unit and/or of the optical receive unit is situated on or inside the envelope surface. In other words, it is therefore advantageous if the optical transmit unit and the optical receive unit are situated on the rotor in such a way that a point of the optical lens that is situated furthest from the axis of rotation is situated further from the axis of rotation than a point of the optical receive unit and of the optical transmit unit. The envelope surface is a surface of a rotational solid that is formed during the rotation of the lens about the axis of rotation. This holds in particular when regarded for a single plane standing perpendicular to the axis of rotation. Put simply, this means that the transmit unit and the optical receive unit are situated in a space around the optical lens that is required for a rotation of the optical lens. However, because the receive unit and the transmit unit rotate with the lens, no collision occurs. In this way, a particularly compact optical scanning system can be provided.

It is also advantageous if the optical axis of the lens stands perpendicular on the axis of rotation. In this way, a particularly large field of view is provided for the optical scanning system, for example in a horizontal plane.

In addition, it is advantageous if the optical receive unit includes a first mirror, the first mirror being configured such that the reflected scanning beam is deflected onto the detector by the first mirror after running through the lens. In this way, it is made possible for a receive beam path to find space between the lens and the detector, because this beam path is folded by the first mirror. Depending on the configuration of the optical components of the receive unit, it is advantageous if the optical receive unit includes additional lenses and mirrors.

In addition, it is advantageous if the first mirror has a focusing surface, in particular a vaulted surface. The first mirror is thus curved. In this way, aberrations of the lens can be partly compensated.

In addition, it is advantageous if the optical transmit unit has an optical emitter and a second mirror, the second mirror being configured in such a way that the scanning beam sent out by the optical emitter is diverted by the second mirror in the direction of the optical axis of the lens. The optical emitter is preferably a laser, in particular a laser diode. Such a configuration of a second mirror makes it possible for only the second mirror, but not the overall optical emitter, to be situated before the lens. In this way, a maximum useful surface of the lens is achieved. This results in a high degree of sensitivity of the optical scanning system.

In addition, it is advantageous if the optical transmit unit includes a collimation lens. In this way, the collimation lens is integrated into the optical scanning system in a space-saving manner. In this way, the optical scanning system can be easily optimized for a particular scanning distance. Here, the collimation lens is in particular a lens of a lens system through which a single scanning beam or a plurality of scanning beams are collimated.

It is also advantageous if the optical receive unit and/or the optical transmit unit includes an optical filter. Through such filters, the sensitivity of the optical scanning system can be achieved while the small constructive shape is maintained.

In particular, it is advantageous if the optical scanning system is a coaxial macroscanner.

BRIEF DESCRIPTION OF THE DRAWINGS

Below, exemplary embodiments of the present invention are described in detail with reference to the figures.

FIG. 1 shows a representation of an optical scanning system according to a first specific embodiment of the present invention.

FIG. 2 shows a representation of a scanning system according to a second specific embodiment of the present invention.

DETAILED DESCRIPTION OF EXAMPLE EMBODIMENTS

Figure 3:
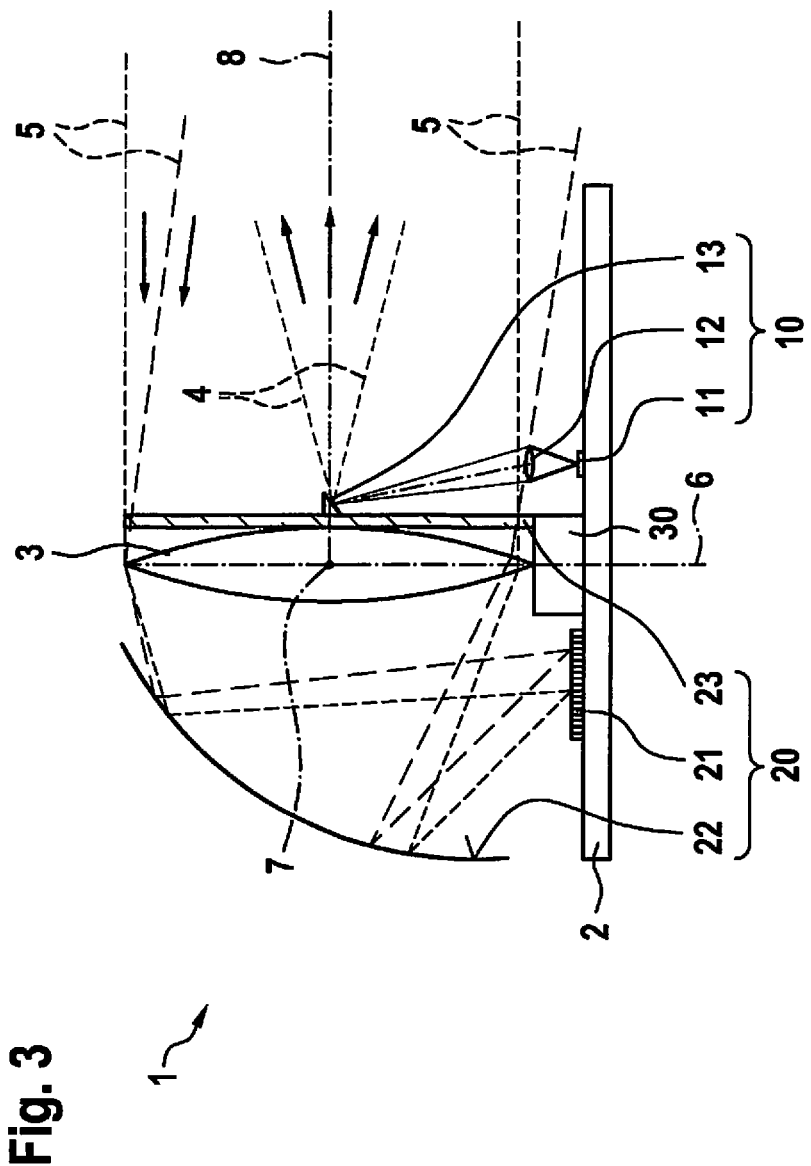
FIG. 3 shows a representation of the scanning system according to the second specific embodiment of the present invention.

FIG. 1 shows an optical scanning system 1 according to a first specific embodiment of the present invention. Here, optical scanning system 1 is shown in a sectional image along a first sectional plane. An axis of rotation of the optical scanning system stands perpendicular to the depicted first sectional plane.

Optical scanning system 1 is a coaxial macroscanner. This means that a scanning beam 4 that is sent out by optical scanning system 1 has an axis that is parallel—in this first specific embodiment, identical—to that of a reflected scanning beam 5 that is received by optical scanning system 1. Optical scanning system 1 includes a rotor 2, an optical lens 3, an optical transmit unit 10, and an optical receive unit 20.

Rotor 2 is set up to rotate about an axis of rotation 6 during a scanning process. In this first specific embodiment of the present invention, rotor 2 is a circular disk and axis of rotation 6 stands perpendicular to a circular surface of rotor 2, running through a midpoint of the circular surface of rotor 2. It is to be noted that in alternative specific embodiments, rotor 2 may have a different shape. Thus, for example rotor 2 may be made up of individual elements that form a mount for further elements of optical scanning system 1, in particular for optical lens 3, optical transmit unit 10, and/or optical receive unit 20. Preferably, rotor 2 has recesses that enable balancing of rotor 2 and the components situated thereon, so that imbalance during rotation is avoided. Optical scanning system 1 includes a motor that drives rotor 2 so as to rotate about axis of rotation 6.

Optical lens 3 is situated on rotor 2 in such a way that a center of gravity 7 of optical lens 3 is situated on axis of rotation 6. Because as a result a point of optical lens 3 is situated on axis of rotation 6, optical lens 3 is situated on the axis of rotation. In this first specific embodiment, optical lens 3 is for example a biconvex lens. Here, a geometrical center of gravity and a mass center of gravity of optical lens 3 are situated at a common center of gravity 7. Optical lens 3 has a lens diameter that matches a diameter of rotor 2. Optical lens 3 is situated centrally on rotor 2. Here, an optical axis 8 of lens 3 is oriented so that it stands perpendicular to axis of rotation 6. In FIG. 1, axis of rotation 6 is shown as a point, because it protrudes from the plane shown in FIG. 1. Optical axis 8 of lens 3 is thus situated in a plane that is parallel to a plane in which rotor 2 rotates.

Optical transmit unit 10 is situated on rotor 2 and is set up to send out a scanning beam 4 in the direction of optical axis 8 of lens 3. In this first specific embodiment of the present invention, optical transmit unit 10 includes an optical emitter 11, which is a laser diode, and a collimation lens 12. Emitter 11 is situated on a first side of optical lens 3, above rotor 2. Here, optical emitter 11 is situated on optical axis 8 of optical lens 3. Optical emitter 11 is oriented such that it emits a laser beam that propagates along optical axis 8 of lens 3, moving away from lens 3. The laser beam emitted by optical imager 11 is scanning beam 4. Before scanning beam 4 is emitted into a surrounding environment of optical scanning system 1, this beam impinges on collimation lens 12, which is situated before optical emitter 11. Alternatively, instead of collimation lens 12, a lens system is provided that includes a plurality of collimation lenses. An expansion of scanning beam 4 can be defined by a distance of collimation lens 12 from optical emitter 11, or by a lens curvature of collimation lens 12. Because optical emitter 11 and collimation lens 12 are situated one after the other on optical axis 8 of lens 3, only a minimal region of lens 3 is occluded by optical transmit unit 10.

Optical scanning system 1 further includes optical receive unit 20, which is situated on rotor 2 and includes a detector 21 that is set up to receive a reflected scanning beam 5, detector 21 being situated such that the reflected scanning beam 5 is focused onto detector 21 by optical lens 3. Here, optical receive unit 20 includes a first mirror 22. First mirror 22 is configured such that the reflected scanning beam 5, after passing through lens 3, is deflected onto detector 21 by first mirror 22. In order to optimize an optical beam path, additional optical elements may optionally be situated in receive unit 20 between lens 3 and first mirror 22. Further optical elements, in particular additional lenses and/or mirrors, may also optionally be situated between first mirror 22 and detector 21.

In addition, optical receive unit 20 includes an optical filter 23. Optical filter 23 is situated on the first side of lens 3, optical filter 23 being situated between transmit unit 10 and optical lens 3. Optical filter 23 extends over an entire surface of optical lens 3. Optical filter 23 is selected such that it is transparent only to light having a wavelength that is in a wavelength region around the wavelength of scanning beam 4.

First mirror 22 is situated on a second side of optical lens 3 that is situated opposite the first side of optical lens 3. First mirror 22 is a concave mirror. In particular, first mirror 22 has individual flat surfaces that are each oriented differently. First mirror 22 deflects the light of reflected scanning beam 5 impinging on it in the direction of detector 21, and focuses it onto this detector. Detector 21 is a so-called sensor array. This means that detector 21 has a surface on which a multiplicity of photosensors is situated. Detector 21 is situated on the second side of optical lens 3. An active surface of detector 21 is oriented such that it is directed away from optical lens 3. Detector 21 is situated in a center of a surface of optical lens 3, i.e. before its center of gravity 7.

If scanning beam 4 has been sent out by optical transmit unit 10, and thus by optical scanning system 1, this beam is reflected by objects in the environment surrounding optical scanning system 1. If this is the case, then the beam is sent back as reflected scanning beam 5. Reflected scanning beam 5 is thus less focused than scanning beam 4. Reflected scanning beam 5 is sent back from the direction in which scanning beam 4 was sent out shortly beforehand. A minimal movement of rotor 2, due to its rotation, has been neglected in this assumption. Reflected scanning beam 5 thus impinges on optical lens 3, and is tapered by it. This tapered reflected scanning beam 5 impinges on first mirror 22 and is reflected by it. As a result, reflected scanning beam 5 is further tapered and focused onto detector 21. Thus, after passing through lens 3, reflected scanning beam 5 is deflected onto detector 21 by first mirror 22. Due to the fact that first mirror 22 is realized as a concave mirror, it has a focusing surface, which is a vaulted surface. The vaulted surface is the reflecting surface of first mirror 22, which is situated such that it lies on a side of first mirror 22 that is situated at the side of optical lens 3.

In this first specific embodiment shown in FIG. 1, a particularly compact optical scanning system 1 is shown. In optical scanning system 1 shown in FIG. 1, optical receive unit 20 and optical transmit unit 10 are situated particularly close to optical lens 3. Optical scanning system 1 is realized such that optical transmit unit 10 and optical receive unit 20 are situated on the rotor in such a way that a region of optical transmit unit 10 and of optical receive unit 20 are situated inside an envelope surface 9. Envelope surface 9 is defined here by an outer circumference of lens 3 during a rotation of optical lens 3 about axis of rotation 6. When optical lens 3 shown in FIG. 1 is set into rotation, then, when the rotation is fast, it is perceived as a sphere, because optical lens 3 has a circular outer circumference. A solid of rotation of optical lens 3 is thus a sphere. Correspondingly, the surface of the sphere is the envelope surface 9 of rotating optical lens 3. In the depicted sectional image, envelope surface 9 is thus a circle such that the outermost points 41, 42 on the outer circumference of optical lens 3 traverse. In the depicted first sectional plane, optical transmit unit 10 and optical receive unit 20 are situated completely inside the circle, and therefore completely inside envelope surface 9.

In this first specific embodiment, both transmit unit 10 and detector 21 are situated in optical axis 8 of optical lens 3, and thus in the optical axis of optical sensor system 1. Optical axis 8 is an axis that runs through the center of optical lens 3. An optical filter 23, in particular a bandpass filter, or other optical filters can optionally also be situated between optical lens 3 and transmit unit 10.

FIG. 2 shows a representation of an optical scanning system 1 according to a second specific embodiment of the present invention. The second specific embodiment of the present invention substantially corresponds to the first specific embodiment of the present invention. FIG. 2 shows the first sectional surface that was also shown in FIG. 1.

The second specific embodiment of the present invention differs from the first specific embodiment of the present invention in that detector 21 and optical emitter 11 are situated on the surface of rotor 2. Emitter 11 is situated such that scanning beam 5 is radiated parallel to axis of rotation 6. A second mirror 13 is situated on the first side of optical lens 3, in the region of the center of the surface of optical lens 3. This mirror is preferably fastened to optical lens 3. Second mirror 13 here stands at a 45° angle relative to scanning beam 4 sent out by emitter 11. Scanning beam 4 is therefore deflected by 90°, and then runs along optical axis 8 of optical lens 3.

Detector 21 is situated on the second side of optical lens 3, on the surface of rotor 2, an active surface of detector 21 being oriented away from rotor 2. In order to enable this configuration of detector 21, a position and curvature of first mirror 22, and a vaulting of first mirror 22, are correspondingly chosen.

In this second specific embodiment, optical emitter 11 and detector 21 are thus situated outside the lens surface of optical lens 8, in a direction defined by optical axis 8 of optical lens 3. This prevents occlusion of the lens by optical emitter 11 and detector 21.

In this second specific embodiment, a small deflecting mirror in the center of optical lens 3 is used as second mirror 13, which optionally can also be curved. This deflecting mirror deflects scanning beam 4 in the direction of optical axis 8 of optical lens 3, and produces the desired vertical divergence. The optionally curved first mirror 22 in the receive beam path is inclined in this second specific embodiment, so that the received beams can be focused onto detector 21. The number of lenses in the receive path can be increased as needed in order to improve the imaging quality, for example by situating an additional lens in front of detector 21.

FIG. 3 shows the optical scanning system 1 according to the second specific embodiment of the present invention. Here, optical scanning system 1 is shown in a sectional image along a second sectional plane in which axis of rotation 6 is situated.

In FIG. 3, it can be seen that second mirror 13 is fastened to optical filter 23. As a result, additional mounting elements for second mirror 13 are omitted. In addition, a collimation lens 12 is situated in the scanning beam 4, between optical emitter 11 and second mirror 13. Thus, in this specific embodiment an adaptation of scanning beam 4 for particular scanning regions is enabled. When scanning beam 4 is sent out by optical emitter 11, this beam runs through collimation lens 12 and impinges on second mirror 13. Due to a corresponding inclination of second mirror 13 relative to emitted scanning beam 4, this beam is oriented along optical axis 8 of lens 3. Second mirror 13 is thus configured in such a way that scanning beam 4 sent out by optical emitter 11 is deflected in the direction of optical axis 8 of lens 3 by second mirror 13. It can be seen that optical lens 3 is situated on a mount 30.

Figure 4:
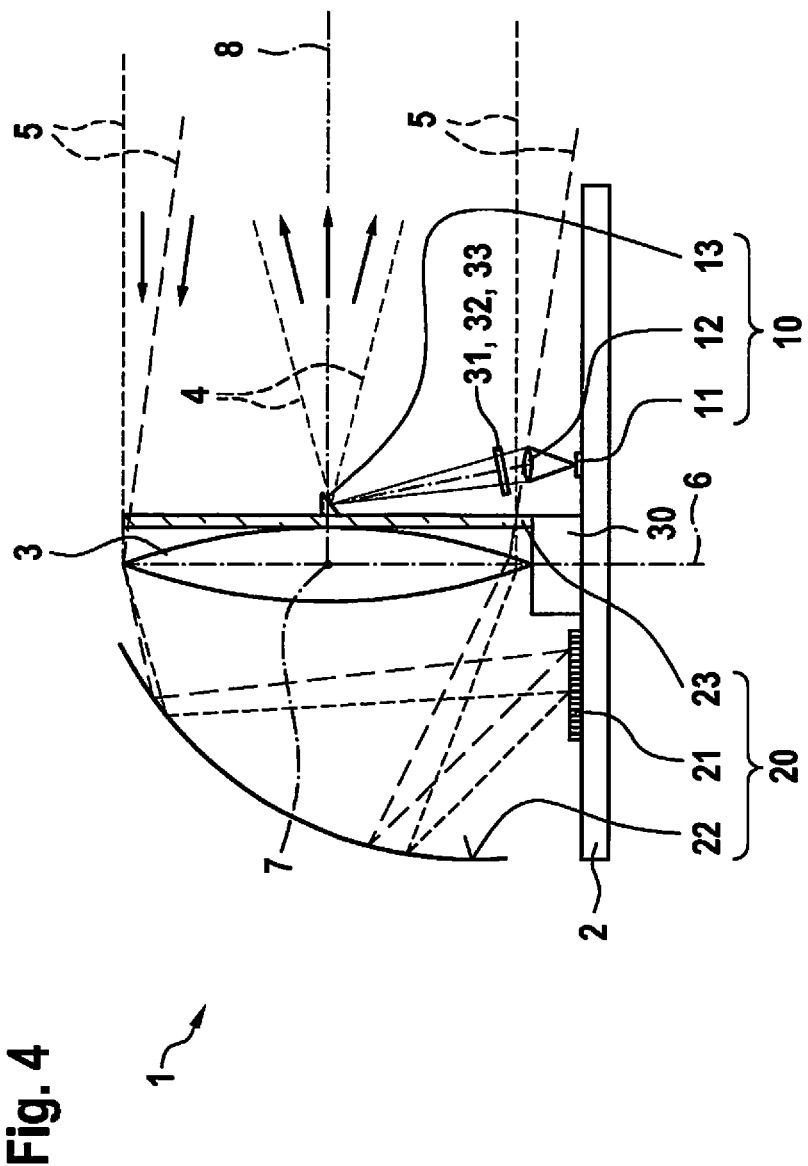
FIG. 4 shows a representation of a scanning system according to a third specific embodiment of the present invention.

FIG. 4 shows an optical scanning system 1 according to a third specific embodiment of the present invention. The third specific embodiment of the present invention substantially corresponds to the second specific embodiment of the present invention. FIG. 4 shows the second sectional plane, also shown in FIG. 3.

Figure 5:
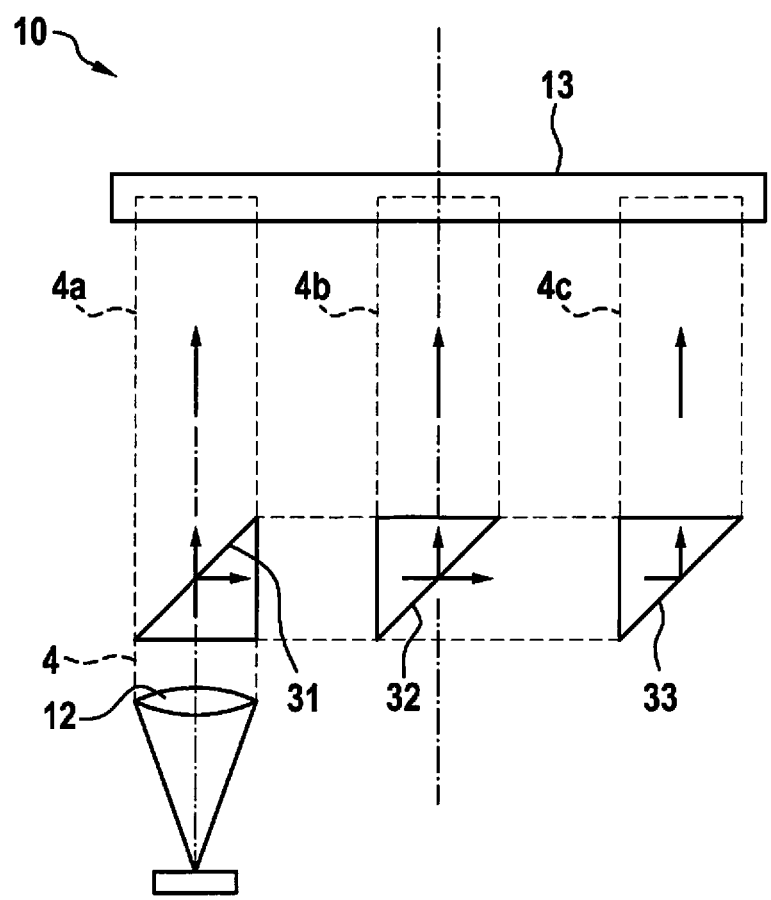
FIG. 5 shows a representation of an advantageous transmit unit.

Scanning system 1 shown in FIG. 4, according to the third specific embodiment of the present invention, includes optical transmit unit 10 shown in FIG. 5. Here, optical transmit unit 10 is a multiple beam splitter. In this embodiment, a first prism 31, a second prism 32, and a third prism 33 are situated between collimation lens 12 and second mirror 13. In this third specific embodiment, the number of prisms is chosen as an example, and may be higher or lower in alternative additional specific embodiments. However, in all specific embodiments it is advantageous for all, or some, of the prisms 31, 32, 33 to be bonded together to form a monolithic component.

After running through collimation lens 12, scanning beam 4 impinges on first prism 31 and is split by it. A portion of the scanning beam impinges on second mirror 13, as a first scanning beam 4a. First scanning beam 4a is deflected, by second mirror 13, in a direction parallel to the optical axis of optical lens 3. Another portion of the scanning beam is deflected onto second prism 32 by first prism 31.

The portion of scanning beam 4 that was deflected onto second prism 33 by first prism 31 is split by second prism 32. Here, a part of scanning beam 4 is deflected onto second mirror 13, as a second scanning beam 4b, and is deflected by this second mirror so as to run parallel to optical axis 8 of optical lens 3. Another portion of scanning beam 4 is deflected onto third prism 33 by second prism 32, and is deflected by this third prism onto second mirror 13, as a third scanning beam 4c. Third scanning beam 4c is deflected by second mirror 13 in such a way that it also runs parallel to the optical axis of optical lens 3.

It is to be noted that first and second prism 31, 32 can also be semitransparent mirrors, and that third prism 33 can be a mirror.

If a laser is used as edge emitter, collimation lens 12 can collimate the fast axis of the laser diode and simultaneously focus the slow axis onto second mirror 13. If a monolithic multiple beam splitter prism is used to multiply the beams, then the transmit beam path can be realized as shown in FIG. 5.

In sum, the subject matter of the present invention is to situate a receive lens, i.e. optical lens 3, in the center of a rotor 2 so that the lens diameter matches the rotor diameter, which corresponds to the, in principle, largest possible receive aperture of a rotating scanner. So that the receive beam path between optical lens 3 and detector 21 will have space inside rotor 2, this beam path is folded using first mirror 22. This first mirror 22 can optionally be curved so that the aberrations of optical lens 3 can be partly compensated. Transmit unit 10, made up of laser 11, collimation lens 12, optional multiple beam splitter, and an optional small deflecting mirror, is preferably situated on the other side of optical lens 3.

The beam expansion is achieved in the along axis of rotation 6 (e.g., vertical axis) via a divergent beam. In the orthogonal (e.g., horizontal) axis, transmit beam 4 is collimated, and is optionally multiplied in order to increase eye safety, for example by the multiple beam splitter shown in FIG. 5. In this way, there results a plurality of parallel line beams that have a distance from one another that is greater than the maximum pupil opening of the human eye (e.g., 8 mm). At the receive side, the receive lens images the various, equally illuminated (vertical) transmit directions onto the one-dimensional detector. The image resolution of the second (horizontal) axis is achieved via the rotation of the scanning head, i.e., rotor 3.

In addition to the above disclosure, reference is explicitly made to the disclosure of FIGS. 1 through 5.

What is claimed is:

1. An optical scanning system, comprising:
   a rotor configured to rotate about an axis of rotation during a scanning process;
   an optical lens situated on the rotor in such a way that the lens is situated on the axis of rotation;
   an optical transmit unit situated on the rotor and configured to send out a scanning beam in a direction of an optical axis of the lens; and
   an optical receive unit situated on the rotor and including a detector that is configured to receive a reflected scanning beam, the detector being situated such that the reflected scanning beam is focused onto the detector by the lens.

2. The optical scanning system as recited in claim 1, wherein a center of gravity of the lens is situated on the axis of rotation.

3. The optical scanning system as recited in claim 1, wherein during a rotation about the axis of rotation, an envelope surface is defined by an outer circumference of the lens, and the optical transmit unit and the optical receive unit are situated on the rotor in such a way that a region of the optical transmit unit and/or of the optical receive unit, is situated on or inside the envelope surface.

4. The optical scanning system as recited in claim 1, wherein the optical axis of the lens is perpendicular to the axis of rotation.

5. The optical scanning system as recited in claim 1, wherein the optical receive unit includes a first mirror, the first mirror being situated such that after running through the lens, the reflected scanning beam is deflected onto the detector by the first mirror.

6. The optical scanning system as recited in claim 5, wherein the first mirror has a focusing surface the focusing surface being a vaulted surface.

7. The optical scanning system as recited in claim 1, wherein the optical transmit unit includes an optical emitter and a second mirror, the second mirror being situated such that the scanning beam sent out by the optical emitter is deflected in the direction of the optical axis of the lens by the second mirror.

8. The optical scanning system as recited in claim 1, wherein the optical transmit unit includes a collimation lens.

9. The optical scanning system as recited in claim 1, wherein the optical receive unit and/or the optical transmit unit includes an optical filter.

10. The optical scanning system as recited in claim 1, wherein the optical scanning system is a coaxial macroscanner.

* * * * *